C. A. TATUM.
CLAMP FOR FLEXIBLE TUBES.
APPLICATION FILED JAN. 22, 1916.
1,190,039.
Patented July 4, 1916.
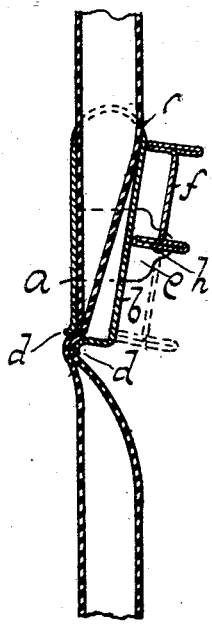
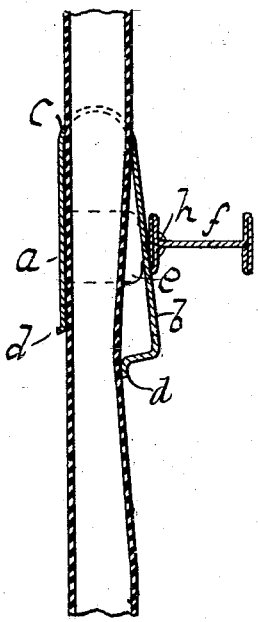
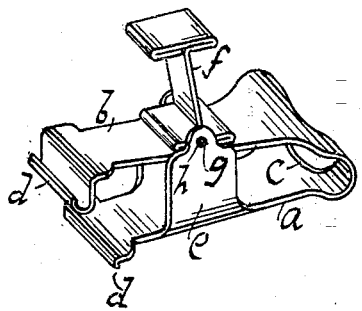
Witnesses
Inventor
Charles A. Tatum
By his Attorneys

UNITED STATES PATENT OFFICE.

CHARLES A. TATUM, OF MIDDLETOWN, NEW JERSEY, ASSIGNOR TO WHITALL TATUM COMPANY, OF NEW YORK, N. Y., A CORPORATION OF NEW JERSEY.

CLAMP FOR FLEXIBLE TUBES.

1,190,039.  Specification of Letters Patent.  Patented July 4, 1916.

Application filed January 22, 1916. Serial No. 73,528.

*To all whom it may concern:*

Be it known that I, CHARLES A. TATUM, a citizen of the United States, residing at Middletown, county of Monmouth, and State of New Jersey, have invented new and useful Improvements in Clamps for Flexible Tubes, of which the following is a specification.

This invention relates to a new and improved form of clamp for flexible tubes, and is designed for use on flexible tubes such as are used on syringes, etc.

The essential feature of my device is that it enables the tube to be shut off tightly and completely stop the flow of liquid. Many attempts have been made to accomplish this result but they have not been successful for the reason that they work on the wrong principle. Nearly all of them try to simply compress the tube in its set position. As is well known the most efficacious way of stopping the flow of liquid in a tube is to press it and at the same time bend it over at a sharp angle. This is accomplished in my device in the manner hereafter pointed out.

In the accompanying drawings Figure 1 is a side view of my device closed on the tube. Fig. 2 is a side view of the device open. Fig. 3 is a view of the device apart from the tube.

The device is formed of a single sheet of resilient sheet metal so bent as to form a lower arm $a$ and an upper arm $b$. The upper arm $b$ is longer than the lower arm $a$ so that when it is pressed down on the tube the upper arm $b$ overlaps the lower arm $a$ and turns the tube off at an angle to its normal position as shown in Fig. 1. A hole $c$ is made in the metal for the tube to pass through and the arms $a$ and $b$ have lips $d$ which clamp on the tube. The lower arm is so cut out as to have wings $e$ which are bent up and form the double function of holding the tube in place and also holding a locking member $f$ which has pins or projections $g$ passing through holes $h$ in the arms $e$. The locking member $f$ by being pivotally connected to the arms $e$ may be pressed down in either direction as shown in Fig. 1, and in which ever direction it is pressed down it will serve to hold the tube in shut off position. This is a great advantage as it can be operated quickly and easily.

The locking member $f$ is shown in the form of an I-shaped lever having upper and lower projections the former being made to form a handle, while the latter serve as a double acting cam for coöperation with the upper arm of the device. The lever is constructed of a single sheet of metal with the handle and cams parallel to each other. The lower part of the lever includes two cams and the fulcrum of the lever, the cams being in a straight line with each other equal distances from the fulcrum so that when the lever is operated one or the other of the cams will actuate the upper arm.

It will be seen that the forward portions of the arms embody jaw members one being beyond the other for positively gripping the adjacent portions of the tube on transverse parallel lines.

I claim:

1. A clamping device for flexible tubes, comprising two arms formed of a single sheet of metal, and having an aperture for a tube to pass through, the forward portions of the arms including jaw members one beyond the other for gripping the adjacent portions of the tube, and a double acting cam lever with a handle said lever being swingingly mounted on one of the arms for coöperation with the other arm.

2. A clamping device for flexible tubes, comprising two arms yieldingly connected together for gripping a tube at their forward ends, and having an aperture for the tube to pass through, a lever swingingly mounted on one of the arms with upper and lower projections to form respectively a handle and a double acting cam for coaction with the other arm.

3. A clamping device for flexible tubes, comprising two arms yieldingly connected together for gripping a tube at their forward ends, and having an aperture for the tube to pass through, and a substantially I shaped lever swingingly mounted on one of the arms the upper portion of which forms a handle while the lower projecting
5 ends include a double acting cam for coaction with the other arm.

In testimony whereof I have hereunto set my hand in the presence of two subscribing witnesses.

CHARLES A. TATUM.

Witnesses:
CHARLES C. VROOM,
HORACE H. REDDY.

Copies of this patent may be obtained for five cents each, by addressing the "Commissioner of Patents, Washington, D. C."